April 19, 1932.   J. DILL   1,855,012
AEROPLANE
Filed April 30, 1931   5 Sheets-Sheet 1

INVENTOR.
John Dill
BY Cornelius Zabriskie
ATTORNEY.

April 19, 1932. J. DILL 1,855,012
AEROPLANE
Filed April 30, 1931  5 Sheets-Sheet 3

INVENTOR.
John Dill
BY Cornelius Zabriskie
ATTORNEY.

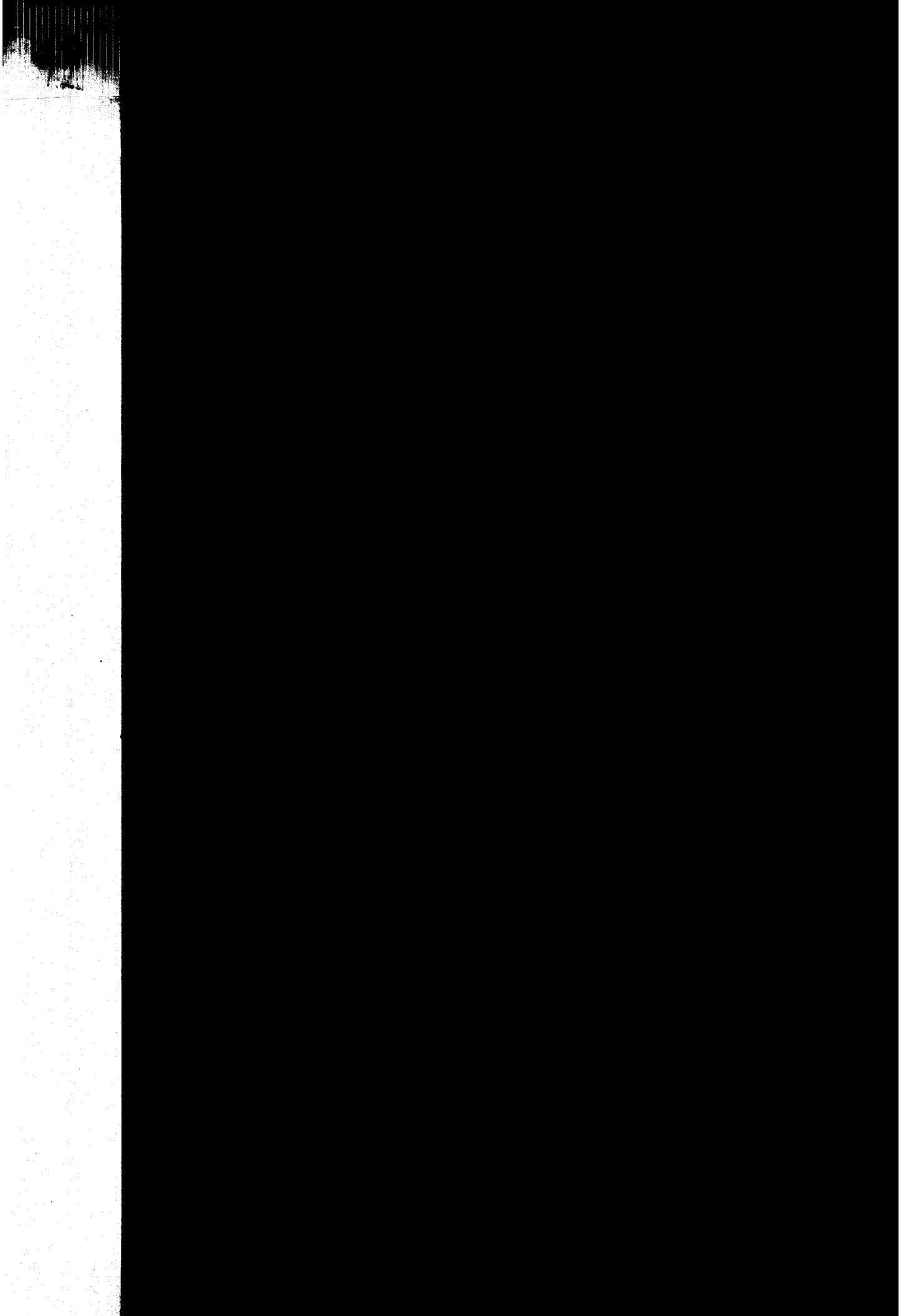

Figure 1:
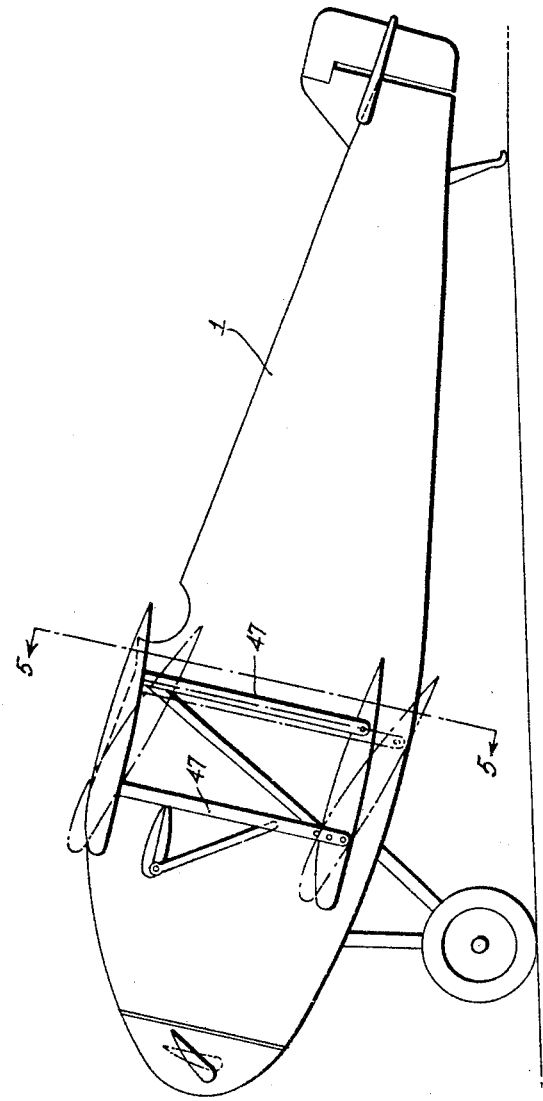
Figure 4:
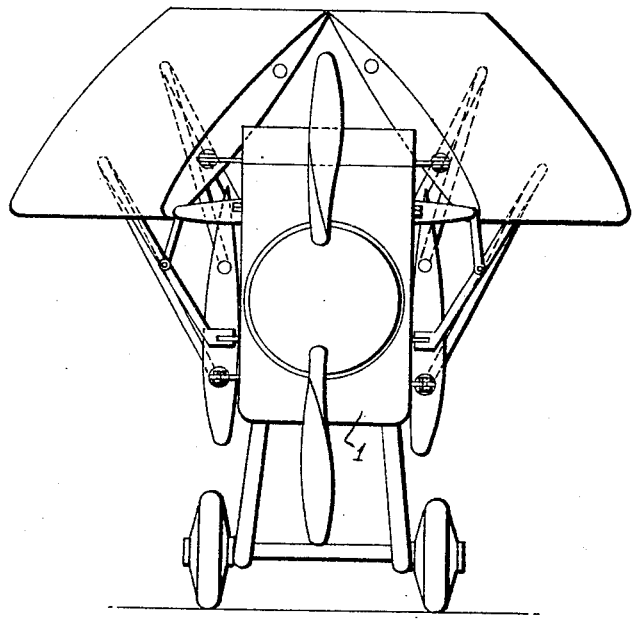
Figure 3:
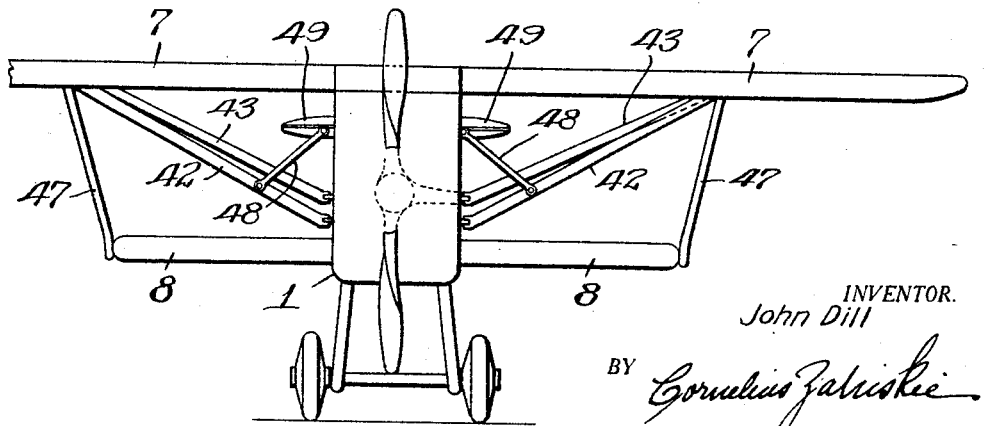

Fig. 6 to the full line position and its shaft 35 is thereupon slid longitudinally until its gear 34 is in mesh with the gear 33. The crank is then turned with the result that the sprocket 28 is rotated to operate the sprocket chain 26 and withdraw the screw members 23 and 24 from the rear spars of the upper and lower wings. After these screw members are withdrawn, the crank shaft 35 is shifted to bring this gear 34 into mesh with the gear 62 and the crank is thereupon operated to wind the cables 67 on the drums 57 and to unwind the cables 70 from the drums 58. This will bring about elevation of the fittings 45 which will force the inboard ends of the struts 43 in an upward direction and thus swing both the upper and lower planes on the axes of the rock shafts 6 into the substantially upright positions shown in full lines in Figs. 2 and 4. After the wings have been tilted upwardly as described, the crank shaft is again shifted longitudinally to bring its gear 34 into mesh with the gear 66 and the crank is thereupon operated to unwind the cable 75 from the drum 56 and to wind it upon the drum 55. By this operation, both brackets 49 are swung outwardly on their pivotal connections 51 and these brackets carry with them the links 48, which, acting as compression members force the struts 42 to partake of rearward pivotal movement on the vertical axes of their fittings 44 and as a result of this operation, the wings are swung back into the dotted line position of Fig. 2 and the full line position of Fig. 4. The wings having thus been folded as stated, the pilot may taxi into the hangar or the ship may be wheeled into the hangar by a ground crew. When the ship is subsequently taken from the hangar for flight, the pilot seated in the cockpit of the machine upon a seat 85 therein may reverse the operations stated to prepare the ship for the air.

The reference character 86 in Fig. 6 designates the lower skin of the fuselage.

The invention is also of particular importance for use on aeroplanes adapted to cooperate with dirigibles and naval aeroplane carriers when used as "mother ships".

The crank 36 for operating the shaft 35 is shown as secured to the after end of this shaft. If desired, is may be secured to the forward end of the shaft and the shaft may be extended forwardly to a point at or ahead of the bars 3 to be operated from a forward cockpit of the ship. In this event, it may be desirable to provide an additional wheel such as the wheel 15 further forward in the ship and have it geared by means of sprockets and chains to the shaft 16, so that this shaft may also be operated from a forward cockpit. I wish it to be understood that I do not limit the invention to these details.

It will be apparent from the foregoing detailed description that the invention embodies many novel features, some of which may in practice be employed without necessarily employing all. I have referred to the invention as adaptable to either nacelle or fuselage types of aircraft and accordingly where I refer to fuselage, I wish it to be understood that this term is to be considered sufficiently broad to cover nacelle.

The drawings show the invention in its preferred practical form, but the invention is to be understood as fully commensurate with the appended claims.

Having thus fully described the invention, what I claim as new and desire to secure by Letters Patent is:

1. In a flying machine, a fuselage, wings pivoted for tilting and folding movement with respect to the fuselage, struts extending from the outboard portions of the wings to the fuselage and pivoted to both the wings and the fuselage, and means acting upon said struts to tilt the wings and fold them into compact relation with respect to the fuselage.

2. In a flying machine, a fuselage, wings pivoted for tilting and folding movement with respect to the fuselage, struts extending from the outboard portions of the wings to the fuselage and pivoted to both the wings and the fuselage, and means acting upon said struts and operable by a person within the fuselage to tilt the wings and fold them into compact relation with respect to the fuselage.

3. In a flying machine, a fuselage, wings pivoted for tilting and folding movement with respect to the fuselage, struts extending from the outboard portions of the wings to the fuselage and pivoted to both the wings and the fuselage, means acting upon certain of the struts to tilt the wings so that their respective cords are in upstanding positions, and means acting upon other of said struts to fold the wings on substantially vertical axes into compact relation with respect to the fuselage.

4. In a flying machine, a fuselage provided with vertically movable strut anchorages, port and starboard wings having their forward portions pivotably secured with respect to the fuselage and their rear portions detachably secured with respect to the fuselage, a forward strut pivotably secured to the outboard portion of each wing near the leading edge thereof and extending to and pivotably secured to the fuselage, a rear strut pivotably secured to the outboard portion of each wing near the trailing edge of the latter and extending to be pivotally secured to one of said vertically movable strut anchorages, means operable, when the rear portions of the wings are detached, to vertically move said strut anchorages for the purpose of tilting the wings into upstanding positions, and means operable upon the forward struts to ing member to be operated for the variation of said pitch, means for varying the incidence of the wings and center section and direct connections between the center section and said regulating member, whereby the pitch of the propeller is varied when the incidence is varied.

13. In a flying machine, a fuselage having upper, starboard and port wings, the inboard ends of which are anchored with respect to the fuselage, rigid struts, the outboard ends of which are secured to the outboard portions of said wings near the leading and trailing edges thereof, and the inboard ends of which struts are secured to the fuselage at vertically spaced points substantially beneath the leading edges of said wings.

14. In a flying machine, a fuselage having upper, starboard and port wings, the inboard ends of which are secured to the fuselage, the outboard portion of each of said wings being supported by two struts, the outboard ends of both of which struts are secured to the wing in the vicinity of the leading and trailing edges, respectively, and the inboard ends of which struts are secured to the fuselage in substantial proximity in the direction of the length of the fuselage and vertically spaced apart.

15. In a flying machine, a fuselage having upper, starboard and port wings, the inboard ends of which are secured to the fuselage, the outboard portion of each of said wings being supported by two struts, the outboard ends of both of which struts are secured to the wing in the vicinity of the leading and trailing edges, respectively, and the inboard ends of which struts are secured to the fuselage at points substantially above one another.

16. In a flying machine, a fuselage having upper, starboard and port wings, the inboard ends of which are secured to the fuselage, the outboard portion of each of said wings being supported by two struts, the outboard ends of both of which struts are secured to the wing in the vicinity of the leading and trailing edges, respectively, and the inboard ends of which struts are secured to the fuselage in substantial proximity in the direction of the length of the fuselage above one another, in combination with starboard and port lower wings, the inboard ends of which are secured to the fuselage and interplane struts connecting the outboard portions of the lower wings directly to the upper wings to support the former from the latter.

17. In a flying machine, a fuselage having upper, starboard and port wings, each having forward and rear spars, the forward spars of which are pivotally secured to the fuselage and the rear spars of which are secured to the fuselage for substantially vertical adjustment, strut anchorages carried by and vertically adjustable with respect to the fuselage, guides for said anchorages, forward struts, the inboard ends of which are pivotally secured to the fuselage in proximity to said guides and the outboard ends of said forward struts being pivotally secured to the outboard portions of the wings adjacent the leading edges of the latter, rear struts, the inboard ends of said rear struts being pivotally connected to said adjustable anchorages, with the outboard ends pivotally secured to the wings adjacent the trailing edge thereof, and means, operable from within the fuselage, to simultaneously vertically adjust the inboard ends of the rear spars and the adjustable anchorages to vary the incidence of said wings.

18. In a flying machine, a fuselage having upper, starboard and port wings, each having forward and rear spars, the forward spars of which are pivotally secured to the fuselage and the rear spars of which are secured to the fuselage for substantially vertical adjustment, strut anchorages carried by and vertically adjustable with respect to the fuselage, guides for said anchorages, forward struts, the inboard ends of which are pivotally secured to the fuselage in proximity to said guides and the outboard ends of said forward struts being pivotally secured to the outboard portions of the wings adjacent the leading edges of the latter, rear struts, the inboard ends of said rear struts being pivotally connected to said adjustable anchorages, with the outboard ends pivotally secured to the wings adjacent the trailing edge thereof, and means, operable from within the fuselage, to simultaneously vertically adjust the inboard ends of the rear spars and the adjustable anchorages to vary the incidence of said wings, in combination with lower port and starboard wings having front and rear spars with the front spars pivotally secured to the fuselage, and the rear spars mounted for vertical adjustment corresponding to the adjustment of the rear spars of the upper wings, and interplane struts connecting the outboard portions of the upper and lower wings together to permit adjustments of the upper wings to be communicated to and produce corresponding adjustments of the lower wings.

19. In a flying machine, a fuselage having port and starboard wings, the inboard ends of which are adjustably secured to the fuselage to permit variation in incidence of the inboard ends of said wings, struts secured to the outboard portions of said wings and extending to and secured to the fuselage, means acting upon the inboard ends of said struts and operable from within the fuselage to vary the relation of said inboard ends for the purpose of varying the incidence of the outboard portions of the wings, and for tilting said wings into positions wherein their chords are substantially vertical.

20. In a flying machine, a fuselage having port and starboard wings, the inboard ends